July 4, 1967

A. FEROY 3,329,069

STEERING GEARS

Filed Sept. 17, 1964

INVENTOR

ARNE FEROY

United States Patent Office 3,329,069
Patented July 4, 1967

3,329,069
STEERING GEARS
Arne Feroy, 20017 42nd Ave. S., Kent, Wash. 98031
Filed Sept. 17, 1964, Ser. No. 397,229
1 Claim. (Cl. 92—33)

This invention relates to steering gears for boats in particular, and to fluid pressure mechanisms for the interconversion of linear and rotary motion in general. The broad object of the invention is to provide a hydraulically operated linear and rotary motion interconversion mechanism in which the axial components of the driving loads on the driven shaft are balanced by fluid pressure. More specifically, an object is to provide a steering gear in which the rudder shaft is turned by oil pressure acting on a piston coaxial therewith by the interaction of helical splines on the piston hub and rudder shaft, and in which the axial components of the driving loads on the helical splines of the rudder shaft are always balanced by fluid pressure acting on another member of the rudder shaft, obviating the need for a thrust bearing on the rudder shaft.

These and other objects will be apparent from the following specification taken in connection with the drawings in which FIG. 1 is a sectional elevation of an embodiment of the invention having two pairs of helical splines;

Figure 1:
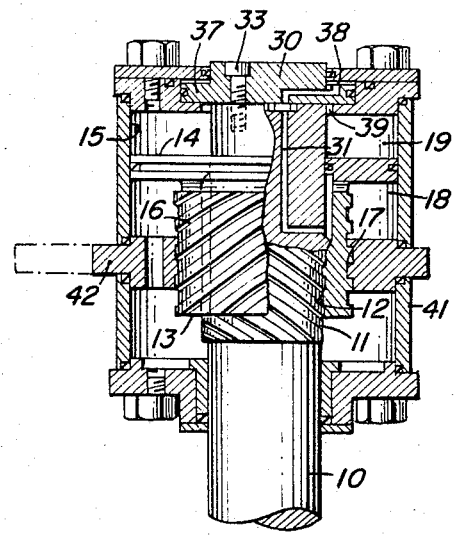

Briefly described, the invention consists of a steering gear wherein the rudder shaft is turned by fluid pressures on a piston member having splines preventing or limiting its rotation relative to the cylinder and also having helical splines engaging other helical splines on the rudder shaft, in combination with balancing piston areas proportioned to balance the axial loads on the rudder shaft, so that axial movement of the piston will produce rotation of the rudder shaft without any need for thrust bearings.

Referring to the drawings, steering gear case 41 is mounted in the after end of boat 40 on the upper end of rudder shaft 10 which turns rudder 44 to steer boat 40. Fluid pressure lines 45 and 46 are connected to case 41 from suitable oil pump and steering control valves not shown.

In FIG. 1 shaft 10 has helical splines 11 operably engaging internal helical splines 12 in piston hub 13 of piston 14 operable in cylinder 15 of case 41. Piston hub 13 has helical splines 16 operable in internal helical splines 17 of flange member 42. Balancing passage 31 connects lower cylinder 18 to balancing chamber 38 above annular flange 37 of disc 30 fastened on the end of shaft 10 by screws 33. Clearance 39 permits oil pressure in upper cylinder 19 to bear on lower face of annular flange 37 of disc 30. The areas of annular flange 37 are so proportioned that, when exposed to fluid pressure in cylinder 15, the resulting axial load on annular flange 37 will balance the axial load on helical splines 11 on shaft 10.

Figure 2:
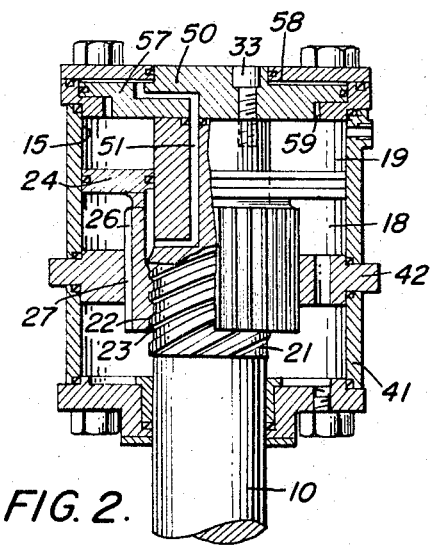
FIG. 2 is a section elevation of another embodiment of the invention having one pair of helical splines.
Figure 3:
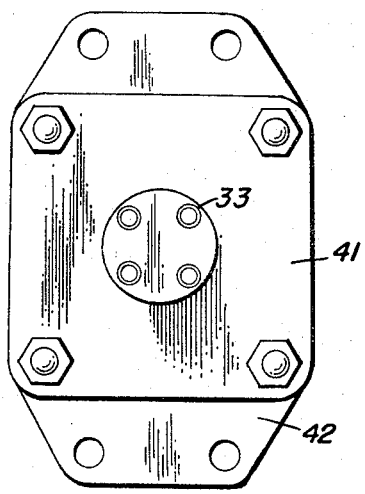
FIG. 3 is a top view of the invention.
Figure 4:
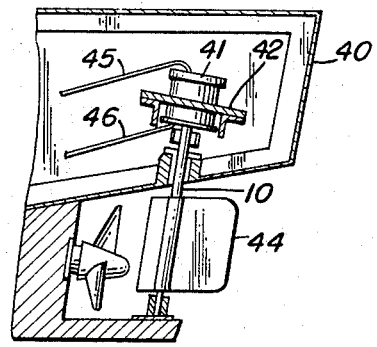
FIG. 4 is a diagrammatic view of the invention installed on the rudder shaft.

In FIG. 2 shaft 10 has helical splines 21 operably engaging internal helical splines 22 in piston hub 23 of piston 24 operable in cylinder 15 in case 41. Piston hub 23 has straight splines 26 operable in internal straight splines 27 of flange member 42. Balancing passage 51 connects lower cylinder 18 to balancing chamber 58 above annual flange 57 of disc 50 fastened on the end of shaft 10 by screws 33. Clearance 59 permits oil pressure in upper cylinder 19 to bear on the outer portion of annular flange 57 of disc 50. The areas of annular flange 57 are so porportioned that, when exposed to fluid pressure in cylinder 15, the resulting axial load on annular flange 57 will balance the axial load on helical splines 11 of shaft 10.

In operation, when it is desired to steer the boat, oil from the pump (not shown) may be forced thru oil pipe 45 to upper chamber 19 (or thru oil pipe 46 to lower chamber 18). In the embodiment of the invention shown in FIG. 1, oil pressure in upper chamber 19 will force piston 14 downward causing rudder shaft 10 to rotate clockwise by the interaction of the helical splines 11, 12, 16, and 17. The downward axial component of the driving force on splines 11 will be balanced by the oil pressure on lower face of annular flange 37 of disc 30 so that the resultant axial load on shaft 10 is zero.

Similarly, oil pressure in lower chamber 18 will force piston 14 upward causing rudder shaft 10 to rotate anticlockwise by the interaction of helical splines 11, 12, 16, and 17. The upward axial component of the driving force on splines 11 will be balanced by the oil pressure (thru balancing passage 31) on the upper face of annular flange 37 of disc 30 so that the resultant axial load on shaft 10 will be zero.

The operation of the embodiment in FIG. 2 is the same except that the use of straight splines 26 and 27 throws the entire axial loading onto helical splines 21 and 22, requiring that the areas of annular flange 57 must be larger than those of annular flange 37 in FIG. 1.

Having thus described the invention and its operation, it is obvious that the objects of the invention have been attained in a simple and practical manner. While particular embodiments of the invention have been shown and described, it is understood that changes may be made in the construction and arrangement of the various parts without departing from the spirit or scope of the invention as expressed in the following claim.

I claim:

In a marine steering gear, a rudder shaft, helical splines thereon, a casing coaxial therewith, a cylinder coaxial in said casing, a piston member axially movable in said cylinder, internal helical splines in said piston member and operably coacting with said helical splines, external splines on said piston member, internal splines in said casing and operably coacting with said splines on said piston member, in combination with a disc coaxial with and attached to said rudder shaft, annular surfaces on said disc, annular chambers above and below said disc, and passsages connecting said annular chambers to the portions of said cylinder below and above said piston member respectively, the structure so proportioned and arranged that the axial components of operating loads on said helical splines on said rudder shaft will be balanced by fluid pressures acting on said annular surfaces of said disc, the resultant axial load on said rudder shaft from steering fluid pressures on said piston being zero.

References Cited

UNITED STATES PATENTS

| 898,462 | 9/1908 | Griessmann | 103—112 |
| 2,570,682 | 10/1951 | Imbert | 308—9 |
| 2,835,205 | 5/1958 | Erdman | 103—112 X |
| 2,955,579 | 10/1960 | Block | 92—33 |
| 2,970,574 | 2/1961 | Geyer | 92—33 |

FOREIGN PATENTS 277,422  11/1951  Switzerland.

MARTIN P. SCHWADRON, Primary Examiner.

I. C. COHEN, Assistant Examiner.